(12) United States Patent
Erdmann (10) Patent No.: US 12,382,872 B2
(45) Date of Patent: Aug. 12, 2025

(54) NET WRAP ROLL WITH LIFT HOOK LOCATION MARKINGS

(71) Applicant: DEERE & COMPANY, Moline, IL (US)

(72) Inventor: Jeremy M. Erdmann, Floris, IA (US)

(73) Assignee: DEERE & COMPANY, Moline, IL (US)

( * ) Notice: Subject to any disclaimer, the term of this patent is extended or adjusted under 35 U.S.C. 154(b) by 302 days.

(21) Appl. No.: 17/933,522

(22) Filed: Sep. 20, 2022

(65) Prior Publication Data

US 2023/0240192 A1    Aug. 3, 2023

Related U.S. Application Data

(60) Provisional application No. 63/267,197, filed on Jan. 27, 2022.

(51) Int. Cl.
*A01F 15/07* (2006.01)
*B65H 18/02* (2006.01)

(52) U.S. Cl.
CPC ........... *A01F 15/071* (2013.01); *B65H 18/02* (2013.01); *A01F 2015/0745* (2013.01); *B65H 2701/1944* (2013.01)

(58) Field of Classification Search
CPC ........... A01F 15/071; A01F 2015/0745; B65H 18/02; B65H 2701/1944
See application file for complete search history.

(56) References Cited

U.S. PATENT DOCUMENTS

| 2005/0211817 A1 | 9/2005 | Muench et al. |
| 2006/0005512 A1 | 1/2006 | Anstey et al. |
| 2022/0015300 A1 | 1/2022 | Derscheid et al. |

FOREIGN PATENT DOCUMENTS

| EP | 3593625 A1 | 1/2020 | |
| WO | WO-2021064224 A1 * | 4/2021 | ......... A01F 15/0705 |

OTHER PUBLICATIONS

Extended European Search Report and Written Opinion issued in European Patent Application No. 22200693.4, dated Jun. 23, 2023, in 06 pages.

* cited by examiner

*Primary Examiner* — Abbas Rashid
*Assistant Examiner* — Stephen M Russell (57) ABSTRACT

A supply roll for a wrap system of a baler implement includes a core having a circumferential wall surface forming a cylindrical shape concentric with a central longitudinal axis. A wrap material includes a length wound about the circumferential wall surface of the core, and defines an exterior circumference. The core and the wrap material cooperate to define a combined center of gravity. An axial position identifier is disposed on the exterior circumference of the wrap material, and is positioned relative to the combined center of gravity to define a desired lift location.

15 Claims, 5 Drawing Sheets

NET WRAP ROLL WITH LIFT HOOK LOCATION MARKINGS

CROSS-REFERENCE TO RELATED APPLICATIONS

This application claims the benefit of U.S. Provisional Patent Application Ser. No. 63/267,197, filed on Jan. 27, 2022, the disclosure of which is hereby incorporated by reference.

TECHNICAL FIELD

The disclosure generally relates to a supply roll of a wrap material for a wrap system of a baler implement, and a method of manufacturing the supply roll.

BACKGROUND

A baler implement gathers crop material and forms the crop material into a baler. The baler implement may be configured as a round baler, which forms the bale into a bale having a cylindrical shape. The baler implement may include a wrap system that is operable to wrap or encircle the bale with a wrap material. The wrap material generally may be supplied on a roll, which is loaded into the wrap system. The bale implement may include a roll lift system for lifting the roll of the wrap material into the wrap system. The roll lift system may include a lift hook, which engages one or more loops encircling the roll of the wrap material. If the lift hook and/or the loops are off center relative to a center of gravity of the roll of the wrap material, the roll of the wrap material may tilt or lean to one side while raising the supply roll of the wrap material into position in the wrap system.

SUMMARY

A supply roll for a wrap system of a baler implement is provided. The supply roll includes a core extending along a central longitudinal axis between a first axial end and a second axial end. The core includes a circumferential wall surface forming a cylindrical shape concentric with the central longitudinal axis. A wrap material includes a width spanning along the central longitudinal axis between the first axial end and the second axial end of the core, and a length wound about the circumferential wall surface of the core. The wrap material defines an exterior circumference substantially perpendicular to the central longitudinal axis. The core and the wrap material cooperate to define a combined center of gravity. An axial position identifier is disposed on the exterior circumference of the wrap material. The axial position identifier is positioned relative to the combined center of gravity to define a desired lift location.

In one aspect of the disclosure, the axial position identifier may include a first axial position identifier and a second axial position identifier spaced apart from each other along the central longitudinal axis and across the combined center of gravity. The first axial position identifier and the second axial position identifier are spaced equidistantly from the combined center of gravity on opposing axial sides of the combined center of gravity along the central longitudinal axis.

In one aspect of the disclosure, the axial position identifier may be positioned along the central longitudinal axis at the combined center of gravity.

In one aspect of the disclosure, the axial position identifier may include a marking printed on the exterior circumference of the wrap material. The marking printed on the exterior circumference of the wrap material may encircle the exterior circumference of the wrap material. In other implementations, the marking may only extend partially around the exterior circumference of the wrap material.

In one aspect of the disclosure, the axial position identifier may include a band wrapped around the exterior circumference of the wrap material.

In one aspect of the disclosure, the supply roll may include a roll cover disposed between the axial position identifier and the wrap material. The axial position identifier may include a marking printed on the roll cover, or a band encircling the roll cover.

A method of manufacturing a supply roll of a wrap material for a wrap system of a baler implement is also provided. The method includes winding the wrap material around a circumferential wall surface of a core. A combined center of gravity of the core and the wrap material may then be determined. An axial position identifier may then be affixed on an exterior circumference of the wrap material relative to the combined center of gravity. The axial position identifier defines a desired lift location determined relative to the combined center of gravity.

In one aspect of the method described herein, the wrap material may be covered with a roll cover prior to affixing the axial position identifier on the exterior circumference of the wrap material.

In one aspect of the method described herein, affixing the axial position identifier on the exterior circumference of the wrap material may include affixing a first axial position identifier and affixing a second axial position identifier equidistantly from the combined center of gravity on opposing axial sides of the combined center of gravity along a central longitudinal axis of the core.

Accordingly, the supply roll described herein includes a marking, i.e., the axial position identifier, that locates the lift location from which the supply roll should be raised. The lift location is determined relative to the combined center of gravity of the core and the wrap material wound thereabout. As such, the axial position identifier enables a user to quickly identify the lift location relative to the combined center of gravity to lift the supply roll in a balanced manner, thereby preventing the supply roll from tilting while being raised. The axial position identifier may include a single marker for a single point lift, or a pair of markers, i.e., the first axial position identifier and the second axial position identifier, for a two-point lift.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a baler implement is generally shown at 20. In the example implementation shown in the figures and described herein, the baler implement 20 is configured to produce a bale having a cylindrical shape, and may be referred to as a round baler. However, it should be appreciated that the baler implement 20 may be configured differently than described herein, and that the teachings of the disclosure may apply to implements other than the round baler described herein.

The baler implement 20 accumulates cut crop material, and forms the accumulated crop material into a bale. In the example implementation described herein, the bale has a cylindrical shape, and may be referred to as a round bale. Generally, the baler implement 20 accumulates the crop material in a bale forming chamber, wherein the baler implement 20 forms the crop material into the round bale. The manner, process, and/or features used to form the crop material into the round bale in the bale forming chamber are known to those skilled in the art, are not pertinent to the teachings of this disclosure, and are therefore not described in detail herein.

Figure 1:
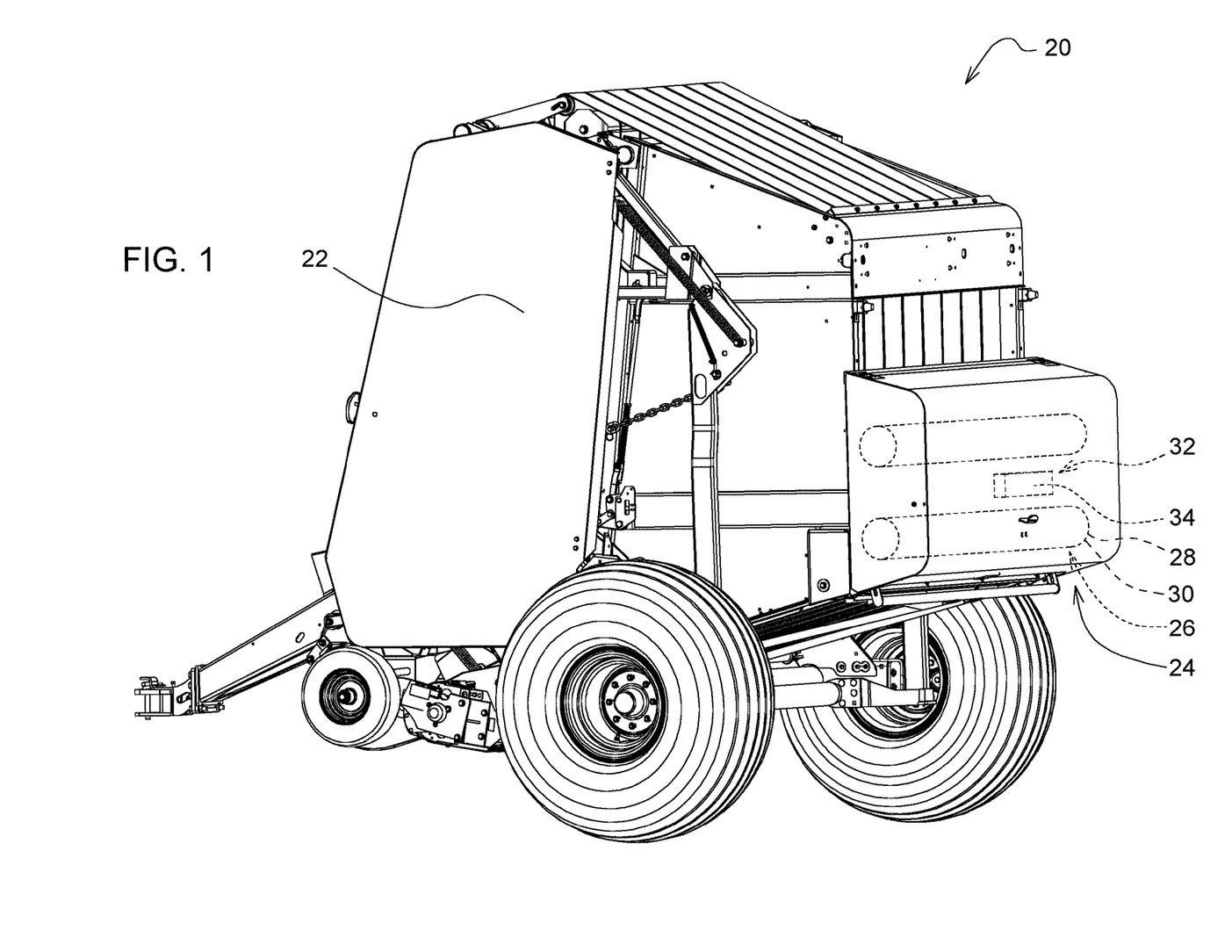
FIG. 1 is a schematic perspective view of a baler implement.
Figure 2:
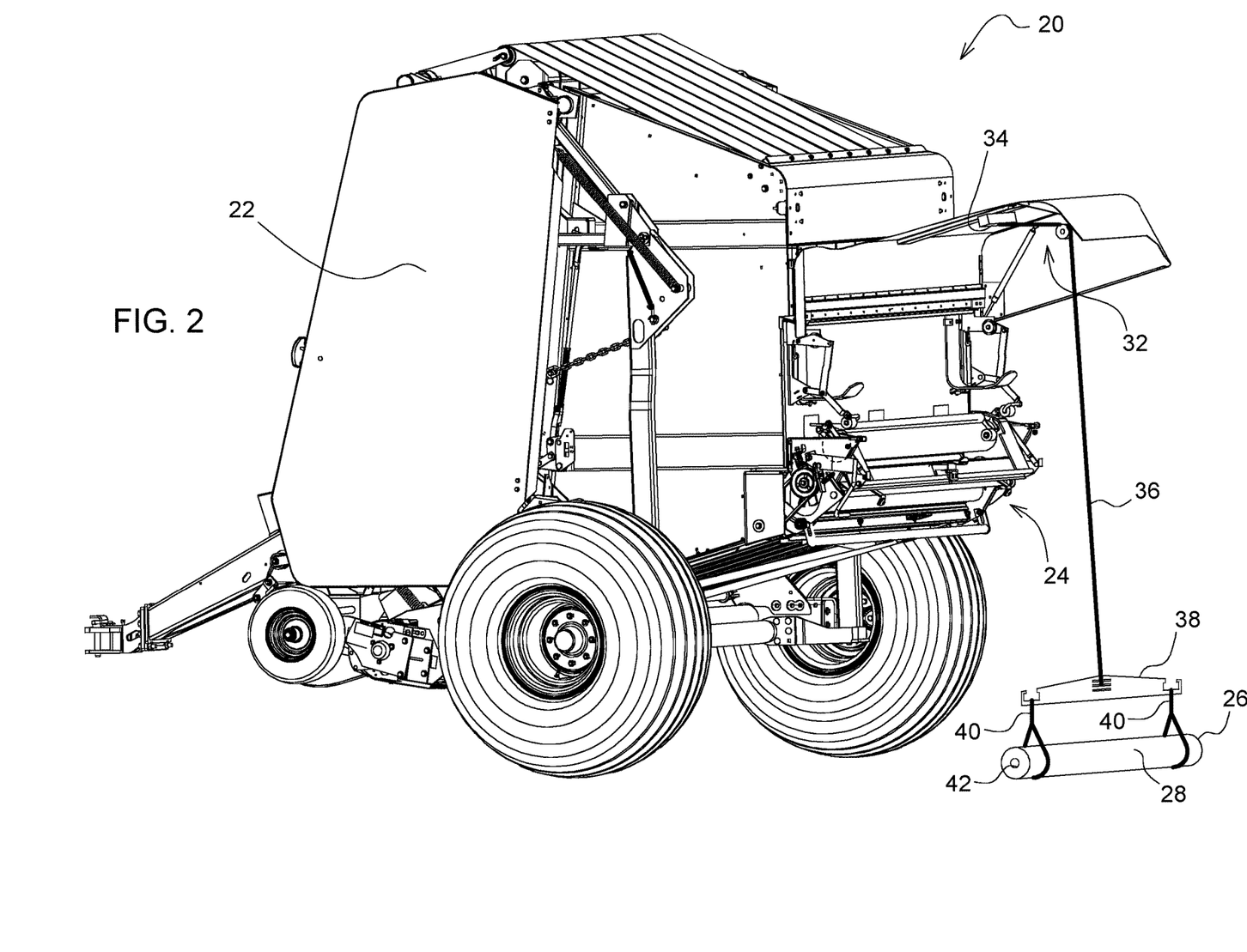
FIG. 2 is a schematic side view of the baler implement showing a lift system raising a supply roll of a wrap material.

Referring to FIGS. 1 and 2, the baler implement 20 includes an implement body 22. The implement body 22 may include one or more panels that form an exterior surface of the baler implement 20, as well as the frame and other support members that support the panels and other components of the baler implement 20. The baler implement 20 includes a wrap system 24 that is attached to the implement body 22. The wrap system 24 includes a supply roll 26 of a wrap material 28 that is supported relative to the implement body 22 in an installed position 30.

The supply roll 26 of the wrap material 28 includes a width that is substantially equal to, or perhaps slightly larger than, a height (or length) of the round bale. The wrap material 28 may include a film, mesh, net, or other material suitable for wrapping around a circumference of the round bale to secure the shape and/or form of the round bale, and/or to protect the round bale from moisture intrusion. For example, the wrap material 28 may include, but is not limited to, a net or a plastic film that is wound around the circumference of the round bale.

The wrap system 24 is configured for wrapping the wrap material 28 around the formed round bale in the bale forming chamber of the baler implement 20. As such, the wrap system 24 un-winds the wrap material 28 from the supply roll 26 of the wrap material 28 and feeds the wrap material 28 into the bale forming chamber, where the wrap material 28 is wound around the circumference of the round bale. The specific manner in which the wrap system 24 un-winds the wrap material 28, feeds the wrap material 28 into the bale forming chamber, and wraps the wrap material 28 around the round bale within the bale forming chamber is not pertinent to the teachings of this disclosure, are known to those skilled in the art, and are therefore not described in detail herein.

Referring to FIGS. 1 and 2, the baler implement 20 further includes a lift system 32. The lift system 32 is operable to raise the supply roll 26 of the wrap material 28, relative to the implement body 22, into the installed position 30. As shown in FIG. 2, the lift system 32 may include a line actuator 34 having a lift line 36. The lift line 36 extends from the lift location downward for engagement with the supply roll 26 of the wrap material 28. The lift line 36 may include, but is not limited to, a cable, a rope, a chain, a strap, etc. The lift line 36 may include or may be attached to a hanger 38 for engaging lifting bands 40 associated with the supply roll 26 of the wrap material 28.

The line actuator 34 may include a mechanism capable of retracting and extending the lift line 36 in order to raise and lower the supply roll 26 of the wrap material 28. For example, the line actuator 34 may include a winding device having a rotatable member that is rotatable about an axis, and that is capable of winding and un-winding the lift line 36 in order to raise and lower the supply roll 26 of the wrap material 28. For example, the line actuator 34 may include, but is not limited to, an electrically driven winch or a manually operated winch that winds and unwinds the lift line 36 to raise and lower the roll. It should be appreciated that the lift system 32 may include a device other than the exemplary embodiments of the line actuator 34 described herein for raising the supply roll 26 of the wrap material 28.

Figure 3:
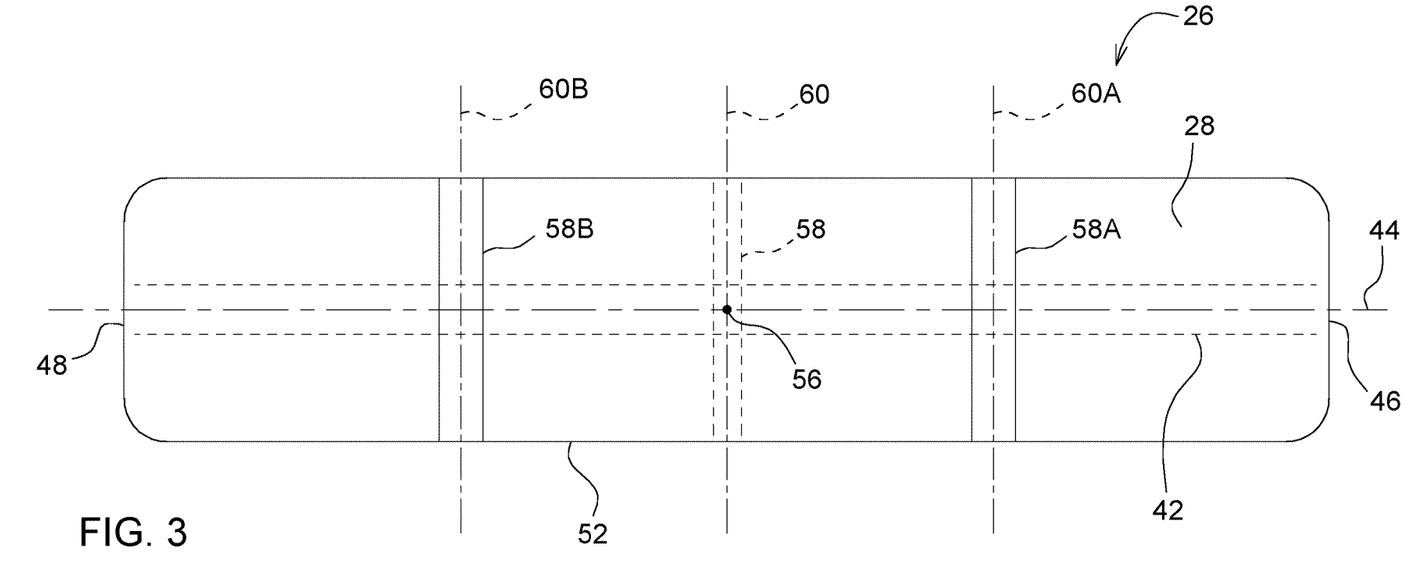
FIG. 3 is a schematic side view of the supply roll.
Figure 4:
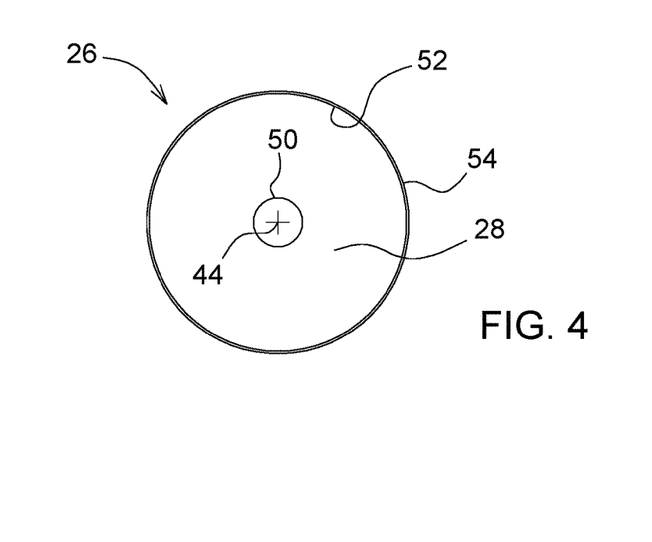
FIG. 4 is a schematic end view of the supply roll.

Referring to FIGS. 3 and 4, the supply roll 26 of the wrap material 28 includes a core 42. The core 42 extends along a central longitudinal axis 44, between a first axial end 46 and a second axial end 48. The core 42 includes a circumferential wall surface 50 forming a cylindrical shape that is concentric with the central longitudinal axis 44. The core 42 may include a hollow tubular structure, or a solid structure. The core 42 may be manufactured from, but is not limited to, a cardboard material, a plastic material, or a metal material. The core 42 provides a rigid structure against which the wrap material 28 may be wound or wrapped, and supports the wrap material 28 while in the wrap system 24 of the baler implement 20.

The wrap material 28 includes a width spanning along the central longitudinal axis 44 of the core 42, between the first axial end 46 and the second axial end 48 of the core 42. The wrap material 28 further includes a length that is wound about the circumferential wall surface 50 of the core 42. The wrap material 28 is wound about the core 42 to form several layers of the wrap material 28 as is understood in the art. The wrap material 28 wound around the core 42 defines an exterior circumference 52. The exterior circumference 52 of the wrap material 28 is substantially perpendicular to the central longitudinal axis 44 of the core 42, and is defined by the outer most layer of the wrap material 28.

A roll cover 54 may be wrapped around the exterior circumference 52 of the wrap material 28 for protection. The roll cover 54 may include, but is not limited to, a solid plastic sheet that is wrapped around the exterior circumference 52 of the wrap material 28 and fully covers the length of the wrap material 28.

The core 42 and the wrap material 28 cooperate to define a combined center of gravity 56 of the supply roll 26. If equipped with the roll cover 54, the roll cover 54 may further contribute to define the combined center of gravity 56 of the supply roll 26. As is understood by those in the art, the combined center of gravity 56 of the supply roll 26 is a point from which the weight of the supply roll 26 may be considered to act.

The supply roll 26 further includes an axial position identifier 58, 58A, 58B that is disposed or positioned adjacent the exterior circumference 52 of the wrap material 28. The axial position identifier 58, 58A, 58B is positioned relative to the combined center of gravity 56 to define a desired lift location 60, 60A, 60B. The desired lift location 60, 60A, 60B is the preferred location from which to lift the supply roll 26 from when raising the supply roll 26 via the lift system 32 into the wrap system 24 of the baler implement 20.

Figure 5:
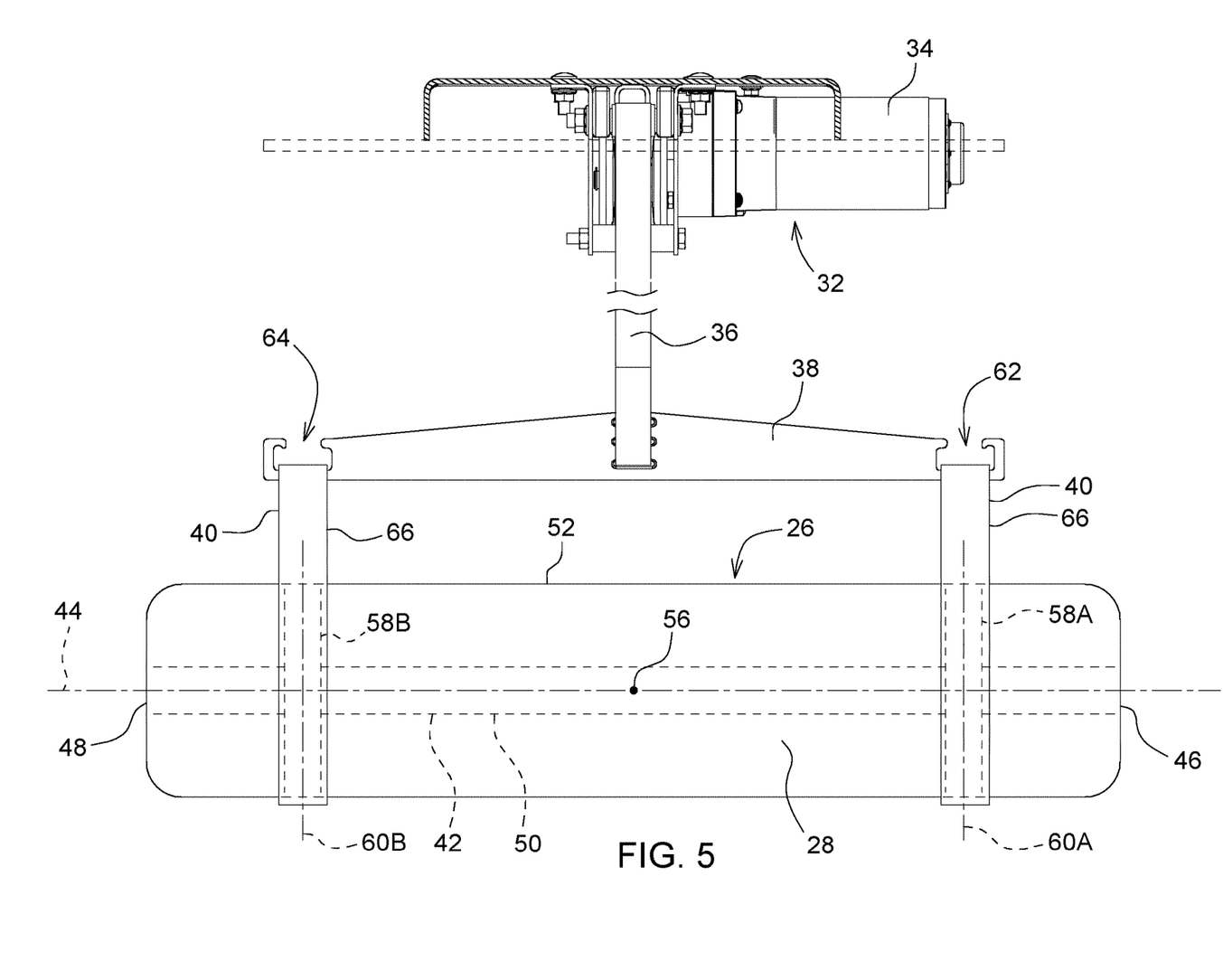
FIG. 5 is a schematic end view showing the lift system coupled to the supply roll of the wrap material using a hanger and two lift locations.

Referring to FIG. 5, as described above, the lift system 32 may utilize the hanger 38 attached to the lift line 36. The hanger 38 has a single attachment location to the lift line 36, but includes two attachment locations for supporting the supply roll 26, i.e., a first pocket 62 and a second pocket 64. The first pocket 62 and the second pocket 64 are spaced equidistance from the lift line 36. Accordingly, in order to secure the supply roll 26 to the hanger 38 of the lift system 32, the axial position identifier may include a first axial position identifier 58A and a second axial position identifier 58B spaced apart from each other along the central longitudinal axis 44 of the core 42 and across the combined center of gravity 56 of the supply roll 26. As such, the first axial position identifier 58A and the second axial position identifier 58B are spaced equidistantly from the combined center of gravity 56 of the supply roll 26 on opposing axial sides of the combined center of gravity 56 along the central longitudinal axis 44 of the core 42.

As noted above, the combined center of gravity 56 of the supply roll 26 is the point at which gravitational forces may be considered to act on the supply roll 26. By lifting the supply roll 26 at two locations that are spaced equidistant from and on opposing sides of the combined center of gravity 56, the supply roll 26 is balanced while raised, and will not significantly shift, tilt or lean. The first axial position identifier 58A may be positioned relative to the combined center of gravity 56 to define a desired first lift location 60A. Similarly, the second axial position identifier 58B may be positioned relative to the combined center of gravity 56 to define a desired second lift location 60B. The first axial position identifier 58A and the second axial position identifier 58B identify the two desired lifting locations 60A, 60B corresponding to the first pocket 62 and the second pocket 64 of the hanger 38 from which to lift the supply roll 26 from. Accordingly, a user may easily identify the desired lift locations 60A, 60B to secure the supply roll 26 to the hanger 38 via the first axial position identifier 58A and the second axial position identifier 58B.

Figure 6:
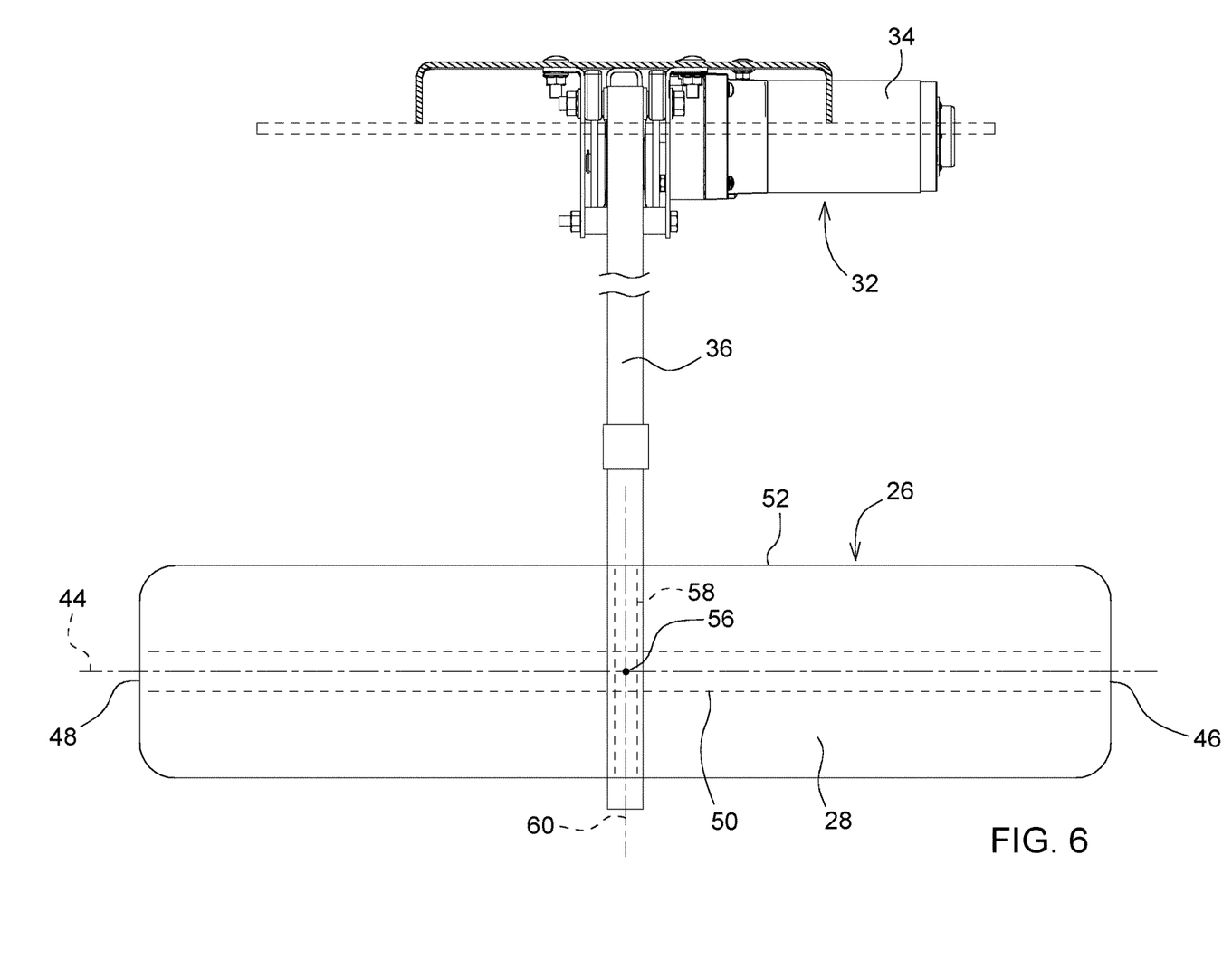
FIG. 6 is a schematic end view showing the lift system coupled to the supply roll of the wrap material using a single lift location.

If the hanger 38 is not used to raise the supply roll 26, the supply roll 26 may be directly attached to the lift line 36, whereby the supply roll 26 is engaged at only a single desired lift location 60. Referring to FIG. 6, when lifting from the single desired lift location 60, the lift line 36 may be secured to the supply roll 26 along the central longitudinal axis 44 at the combined center of gravity 56. As such, the axial position identifier 58 may be positioned along the central longitudinal axis 44 at the combined center of gravity 56 to identify the desired lift location 60 for a single location lift.

The axial position identifier 58, 58A, 58B may include a marking printed or otherwise affixed on the exterior circumference 52 of the wrap material 28. For example, the axial position identifier 58, 58A, 58B may include a paint or ink marking applied to the exterior circumference 52 of the wrap material 28. The axial position identifier 58, 58A, 58B may include a marking that does not fully encircle the exterior circumference 52 of the wrap material 28, e.g., a dot, dash, star, etc. In other implementations, the axial position identifier 58, 58A, 58B may include a making that does fully encircles the exterior circumference 52 of the wrap material 28.

As noted above, the axial position identifier 58, 58A, 58B may include a paint or ink marking applied to the exterior circumference 52 of the wrap material 28. In other implementations, the axial position identifier 58, 58A, 58B may include the lifting band 40 wrapped around the exterior circumference 52 of the wrap material 28 in a manner that prevents relative movement between the lifting band 40 and the supply roll 26, e.g., a tight frictional engagement. It is contemplated that the lifting band 40 utilized for the axial position identifier 58, 58A, 58B may further include a loop 66, hook, or other feature configured for engaging the hanger 38 and/or the lift line 36 to attach the supply roll 26 thereto.

In other implementations, if the supply roll 26 is equipped with the roll cover 54, the axial position identifier 58, 58A, 58B may be affixed to the exterior of the roll cover 54, such that the roll cover 54 is disposed between the axial position identifier 58, 58A, 58B and the wrap material 28. For example, the axial position identifier 58, 58A, 58B may include a marking printed or painted onto the roll cover 54. In other implementations, if the roll cover 54 is clear and/or generally translucent, the axial position identifier 58, 58A, 58B may be affixed to the exterior circumference 52 of the wrap material 28 underneath the roll cover 54, such that the axial position identifier 58, 58A, 58B is visible through the roll cover 54.

A method of manufacturing the supply roll 26 is also provided. The method includes winding the wrap material 28 around the circumferential wall surface 50 of the core 42. The wrap material 28 may then be covered with the roll cover 54 if desired.

A combined center of gravity 56 of the core 42 and the wrap material 28 is then determined. If the supply roll 26 includes the roll cover 54, it should be appreciated that the combined center of gravity 56 includes the roll cover 54 in combination with the core 42 and the wrap material 28. The combined center of gravity 56 may be determined by, for example, balancing the supply roll 26 to identify the combined center of gravity 56. In other implementations, the combined center of gravity 56 may be determined for a specific test supply roll 26, whereby the combined center of gravity 56 for the specific test supply roll 26 may be presumed to approximate the combined center of gravity 56 of all future supply rolls 26 of the same size, material, and construction.

Once the combined center of gravity 56 is determined, the axial position identifier 58, 58A, 58B may be affixed onto an exterior circumference 52 of the wrap material 28 or the roll cover 54. The position of the axial position identifier 58, 58A, 58B is determined relative to the combined center of gravity 56 at the defined lift location. Affixing the axial position identifier 58, 58A, 58B onto the exterior circumference 52 of the wrap material 28 may include, but is not limited to, painting or marking the axial position identifier 58, 58A, 58B onto the exterior circumference 52 of the wrap material 28 or the roll cover 54. In other implementations, affixing the axial position identifier 58, 58A, 58B onto the exterior circumference 52 of the wrap material 28 may include, but is not limited to, securing the lifting band 40 or strap around the supply roll 26.

If the supply roll 26 is to be raised with a single lift location, then affixing the axial position identifier 58 on the exterior circumference 52 of the wrap material 28 includes affixing the axial position identifier 58 at the location along the central longitudinal axis 44 corresponding to the location of the combined center of gravity 56 along the central longitudinal axis 44.

If the supply roll 26 is to be raised with two lift locations, i.e., the first and second desired lifting locations 60A, 60B, then affixing the axial position identifier 58A, 58B on the exterior circumference 52 of the wrap material 28 includes affixing the first axial position identifier 58A at the first desired lift location 60A relative to the combined center of gravity 56, and affixing the second axial position identifier 58B at the second desired lift location 60B relative to the combined center of gravity 56. The first axial position identifier 58A and the second axial position identifier 58B are affixed equidistantly from the combined center of gravity 56 on opposing axial sides of the combined center of gravity 56 along the central longitudinal axis 44 of the core 42.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A supply roll of wrap material for a wrap system of a baler implement, the supply roll of wrap material comprising:
   a core extending along a central longitudinal axis between a first axial end and a second axial end, wherein the core includes a circumferential wall surface forming a cylindrical shape concentric with the central longitudinal axis;
   a wrap material having a width spanning along the central longitudinal axis between the first axial end and the second axial end of the core, and a length wound about the circumferential wall surface of the core, wherein the wrap material defines an exterior circumference substantially perpendicular to the central longitudinal axis;
   wherein the core and the wrap material cooperate to define a combined center of gravity; and
   an axial position identifier on the exterior circumference of the wrap material and positioned relative to the combined center of gravity to define a desired lift location for lifting the supply roll of wrap material into the wrap system of the baler implement.

2. The supply roll set forth in claim 1, wherein the axial position identifier includes a first axial position identifier and a second axial position identifier spaced apart from each other along the central longitudinal axis and across the combined center of gravity.

3. The supply roll set forth in claim 2, wherein the first axial position identifier and the second axial position identifier are spaced equidistantly from the combined center of gravity on opposing axial sides of the combined center of gravity along the central longitudinal axis.

4. The supply roll set forth in claim 1, wherein the axial position identifier is positioned along the central longitudinal axis at the combined center of gravity.

5. The supply roll set forth in claim 1, wherein the axial position identifier includes a marking printed on the exterior circumference of the wrap material.

6. The supply roll set forth in claim 1, wherein the axial position identifier includes a band wrapped around the exterior circumference of the wrap material.

7. The supply roll set forth in claim 1, further comprising a roll cover disposed between the axial position identifier and the wrap material.

8. The supply roll set forth in claim 6, wherein the axial position identifier includes a marking printed on the roll cover.

9. The supply roll set forth in claim 1, wherein the axial position identifier encircles the exterior circumference of the wrap material.

10. A supply roll of wrap material for a wrap system of a baler implement, the supply roll of wrap material comprising:
    a core extending along a central longitudinal axis between a first axial end and a second axial end, wherein the core includes a circumferential wall surface forming a cylindrical shape concentric with the central longitudinal axis;
    a wrap material having a width spanning along the central longitudinal axis between the first axial end and the second axial end of the core, and a length wound about the circumferential wall surface of the core, wherein the wrap material defines an exterior circumference substantially perpendicular to the central longitudinal axis;
    wherein the core and the wrap material cooperate to define a combined center of gravity; and
    a first axial position identifier on the exterior circumference of the wrap material and positioned relative to the combined center of gravity to define a desired first lift location;
    a second axial position identifier on the exterior circumference of the wrap material and positioned relative to the combined center of gravity to define a desired second lift location; and
    wherein the first axial position identifier and the second axial position identifier are spaced equidistantly from the combined center of gravity on opposing axial sides of the combined center of gravity along the central longitudinal axis to define a desired balanced lift location for lifting the supply roll of wrap material into the wrap system of the baler implement.

11. The supply roll set forth in claim 10, wherein the first axial position identifier and the second axial position identifier each include a respective marking printed on the exterior circumference of the wrap material.

12. The supply roll set forth in claim 10, wherein the first axial position identifier and the second axial position identifier each include a respective band wrapped around the exterior circumference of the wrap material.

13. The supply roll set forth in claim 10, further comprising a roll cover disposed between the first axial position identifier and the wrap material, and between the second axial position identifier and the wrap material.

14. The supply roll set forth in claim 13, wherein the first axial position identifier and the second axial position identifier each include a respective marking printed on the roll cover.

15. The supply roll set forth in claim 10, wherein the first axial position identifier and the second axial position identifier each encircle the exterior circumference of the wrap material.

* * * * *